US007908281B2

(12) United States Patent
Marceau et al.

(10) Patent No.: US 7,908,281 B2
(45) Date of Patent: Mar. 15, 2011

(54) DYNAMIC ASSEMBLY OF INFORMATION PEDIGREES

(75) Inventors: Carla Marceau, Ithaca, NY (US); Matthew A. Stillerman, Ithaca, NY (US); David Rosenthal, Ithaca, NY (US); Marisa Gioioso, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 403 days.

(21) Appl. No.: 11/943,374

(22) Filed: Nov. 20, 2007

(65) Prior Publication Data

US 2008/0120281 A1 May 22, 2008

Related U.S. Application Data

(60) Provisional application No. 60/867,014, filed on Nov. 22, 2006, provisional application No. 60/910,679, filed on Apr. 9, 2007.

(51) Int. Cl.
*G06F 17/30* (2006.01)
*G06F 7/00* (2006.01)

(52) U.S. Cl. .......... 707/751; 707/770; 707/773; 707/775

(58) Field of Classification Search .................. 707/726, 707/751, 770, 773, 775
See application file for complete search history.

(56) References Cited

U.S. PATENT DOCUMENTS

| 7,523,121 | B2 * | 4/2009 | Hoang et al. | 707/101 |
|---|---|---|---|---|
| 2003/0018607 | A1 * | 1/2003 | Lennon et al. | 707/1 |
| 2004/0064335 | A1 * | 4/2004 | Yang | 705/1 |
| 2006/0036593 | A1 * | 2/2006 | Dean et al. | 707/4 |

OTHER PUBLICATIONS

M.M. Kokar et al., "Association in Level 2 fusion," Proceedings of SPIE, vol. 5434, Multisensor, Multisource Information Fusion: Architectures, Algorithms, and Applications 2004, B.V. Dasarathy, Editor, Apr. 2004, pp. 228-237.
S. Miles et al., "The requirements of recording and using provenance in e-Science experiments," Journal of Grid Computing, 2006, 15 pgs.
R. Fjellheim et al., "AKSIO—An Application of Semantic Web technology for knowledge management in the petroleum industry," ISWC 2005, Nov. 2005, 3 pgs.
P.P. da Silva et al., "Knowledge Provenance Infrastructure," IEEE Data Engineering Bulletin, vol. 26, No. 4, Dec. 2003, 7 pgs.

(Continued)

*Primary Examiner* — Tim T. Vo
*Assistant Examiner* — Sangwoo Ahn
(74) *Attorney, Agent, or Firm* — Shumaker & Sieffert, P.A.

(57) ABSTRACT

This disclosure describes techniques of dynamically assembling and utilizing a pedigree of a resource. A pedigree of a resource is a set of statements that describe a provenance of the resource. As described herein, a set of one or more servers may host context objects that contain the statements that make up the pedigree of the resource. In order to obtain the pedigree of the resource, a context assembly device may send queries to the servers for context objects that are likely to contain statements in the pedigree of the resource. After receiving context objects from the servers in response to the queries, the context assembly device may query the statements in the received context objects in order to identify, among the statements in the context objects, the statements that constitute the pedigree of the resource. The dynamically assembled pedigree may then be used in a variety of ways.

18 Claims, 6 Drawing Sheets

OTHER PUBLICATIONS

J. Golbeck et al., "Trust network-based filtering of aggregated claims," Int. J. Metadata, Semantics and Ontologies Bulletin, vol. 1, No. 1, 2006, pp. 58-65.

H. Qi et al., "Multisensor Data Fusion in Distributed Sensor Networks Using Mobile Agents," Proc. Int'l Conf. Information Fusion, Aug. 2001, 6 pgs.

K.K. Muniswamy-Reddy et al., "Provenance-Aware Storage Systems," 2006 USENIX Annual Technical Conference, Sep. 2006, 15 pgs.

S. Koide et al., "Decision Support System for Rocket Launch Using Semantic Web Services," Advanced Intelligent Mechatronics, Proceedings, 2005 IEEE/ASME International Conference, Sep. 2005, 4 pgs.

B. Aleman-Meza et al., "Collective Knowledge Composition in a Peer-to-Peer Network: A survey for Peer-to-Peer applications," Encyclopedia of Database Technologies and Applications, Aug. 2005, 6 pgs.

A. Uszok et al., "KAoS Policy and Domain Services: Toward a Description-Logic Approach to Policy Representation, Deconfliction, and Enforcement," Fourth IEEE International Workshop on Policies for Distributed Systems and Networks (Policy '03), 2003, 4 pgs.

AJ. Broekstra et al., "Inferencing and Truth Maintenance in RDF Schema: Exploring a naïve practical approach," Workshop on Practical and Scalable Semantic Systems (PSSS), 2003, 14 pgs.

E.F. Codd, "A Relational Model of Data for Large Shared Data Banks," Communications of the ACM, vol. 13, No. 6, Jun. 1970, pp. 377-387.

R. Lee, "Scalability Report on Triple Store Applications," Jul. 14, 2004, http://simile.mit.edu/reports/stores/, 21 pgs.

M. McGuire et al., "Coalition Transformation: An Evolution of People, Processes and Technology to Enhance Interoperability," Agile Coalition Environment (ACE), 9th International Command and Control Research and Technology Symposium, Sep. 14-26, 2004, http://www.dodccrp.org/events/2004/ICCRTS_Denmark/CD/papers/041.pdf, 9 pgs.

* cited by examiner

DYNAMIC ASSEMBLY OF INFORMATION PEDIGREES

This application claims the benefit of U.S. provisional Application Ser. No. 60/867,014 filed Nov. 22, 2006 and U.S. provisional Application Ser. No. 60/910,679 filed Apr. 9, 2007, the entire content of each of which is hereby incorporated by reference.

STATEMENT REGARDING FEDERALLY SPONSORED RESEARCH OR DEVELOPMENT

This invention was made with Government support under Contract No. FA8750-06-C-0023. The Government has certain rights in this invention.

TECHNICAL FIELD

The invention relates to computer networks and specifically to analysis of information on computer networks.

BACKGROUND

When information is presented to a user, the user may have little or no idea how trustworthy the information is. For example, it may be unclear whether the information is truth or fiction. However, one way to determine the trustworthiness of a piece of information is to identify the provenance of the piece of information. For instance, the user can determine who first created the piece of information and what other entities had the opportunity to manipulate (e.g., paraphrase, summarize, etc.) the piece of information before the piece of information was presented to the user. The user may then decide whether to trust the piece of information based whether the user trusts the person who first created the information and the whether the user trusts any entities that manipulated the piece of information prior to its presentation to the user.

SUMMARY

This disclosure describes techniques of discovering, procuring and utilizing a pedigree of a resource. As used in this disclosure, a "resource" is an instance of a concept and typically presents one or more asserted fact. Furthermore, as used in this disclosure, a pedigree of a resource is a set of statements that describe a provenance of the resource, i.e., a history of origin of the resource.

As described herein, a set of one or more potentially remotely distributed pedigree management servers host context objects that contain the statements that can be dynamically assembled to form the pedigree of the resource. In order to obtain the pedigree of the resource, a context assembly device may send to the pedigree management servers queries for context objects that are likely to contain statements in the pedigree of the resource. After receiving context objects from the pedigree management servers in response to the queries, the context assembly device may cache the statements and the apply a second query to the statements in the received context objects in order to extract those statements that are necessary to assembly the pedigree of the resource. This two-stage query process may then be repeated to assemble additional layers of pedigree information from the distributed pedigree management servers. In this way, the context assembly device dynamically assembles the pedigree of the resource from disparate sources. The dynamically assembled pedigree may then be used in a variety of ways.

For example, a web browser application may present a web page to a user along with an icon or other input mechanism that, when selected, presents a trustworthiness assessment of a particular asserted fact in the web page (i.e., assessment of the trustworthiness of an individual resource). In order to present the trustworthiness assessment, the web browser application may require a pedigree of the asserted fact. The web browser may request that a context assembly device dynamically assemble the pedigree of the asserted fact. After the context assembly device assembles the pedigree of the asserted fact, the context assembly device may provide the pedigree of the asserted fact to the web browser. The web browser application may then use the pedigree of the asserted fact to evaluate whether the sources of the asserted fact indicates that the asserted fact is trustworthy.

In addition to the dynamic assembly and use of pedigrees of resources, the techniques of this disclosure may be extended to the computer-aided dynamic assembly and use of "information contexts" of resources. As used herein, an "information context" of a resource is a set of statements that describe direct and/or indirect relationships between the resource and other resources. For example, an information context of a resource may be a set of statements that describe resources derived from the resource. In this manner, the information context may be viewed as the inverse of a pedigree. That is, this information context describes temporal/sequential relationships as to how the resource was subsequently used instead of how the resource was derived. In many cases, however, the information context may describe other relationships, such as resource traits or attributes, and need not necessarily describe temporal/sequential relationships of the resources.

In one embodiment, a method comprises receiving a request to assemble an information context of a primary resource. The information context of the primary resource includes a set of statements that describe direct relationships between the primary resource and other resources. In addition, the method comprises submitting to a set of one or more servers a query for context objects that include one or more statements that specify a direct relationship between the primary resource and other resources. Furthermore, the method comprises receiving, in response to the query, a set of context objects, each of which includes one or more statements that specify a direct relationship between the primary resource and other resources. The method also comprises identifying, among the statements in the set of context objects, the statements that describe direct relationships between the primary resource and other resources.

In another embodiment, a device comprises an interface that receives a request to assemble an information context of a primary resource. The information context of the primary resource includes a set of statements that describe direct relationships between the primary resource and other resources. The device also comprises a first-stage query module that submits to a set of one or more servers a query for context objects that include one or more statements that specify a direct relationship between the primary resource and other resources. The interface receives, in response to the query, a set of context objects, each of which includes one or more statements that specify a direct relationship between the primary resource and other resources. In addition, the device comprises a second-stage query module that identifies among the statements in the set of context objects, statements in the set of statements that describe direct relationships between the primary resource and other resources.

In another embodiment, a computer-readable medium comprises instructions. The instructions cause one or more processors to receive a request to assemble an information context of a primary resource. The information context of the primary resource includes a set of statements that describe direct relationships between the primary resource and other resources. The instructions also cause the one or more processors to submit to a set of one or more servers a query for context objects that include one or more statements that specify a direct relationship between the primary resource and other resources. In addition, the instructions cause the one or more processors to receive, in response to the query, a set of context objects, each of which includes one or more statements that specify a direct relationship between the primary resource and other resources. Furthermore, the instructions cause the one or more processors to identify among the statements in the set of context objects, statements in the set of statements that describe direct relationships between the primary resource and other resources.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
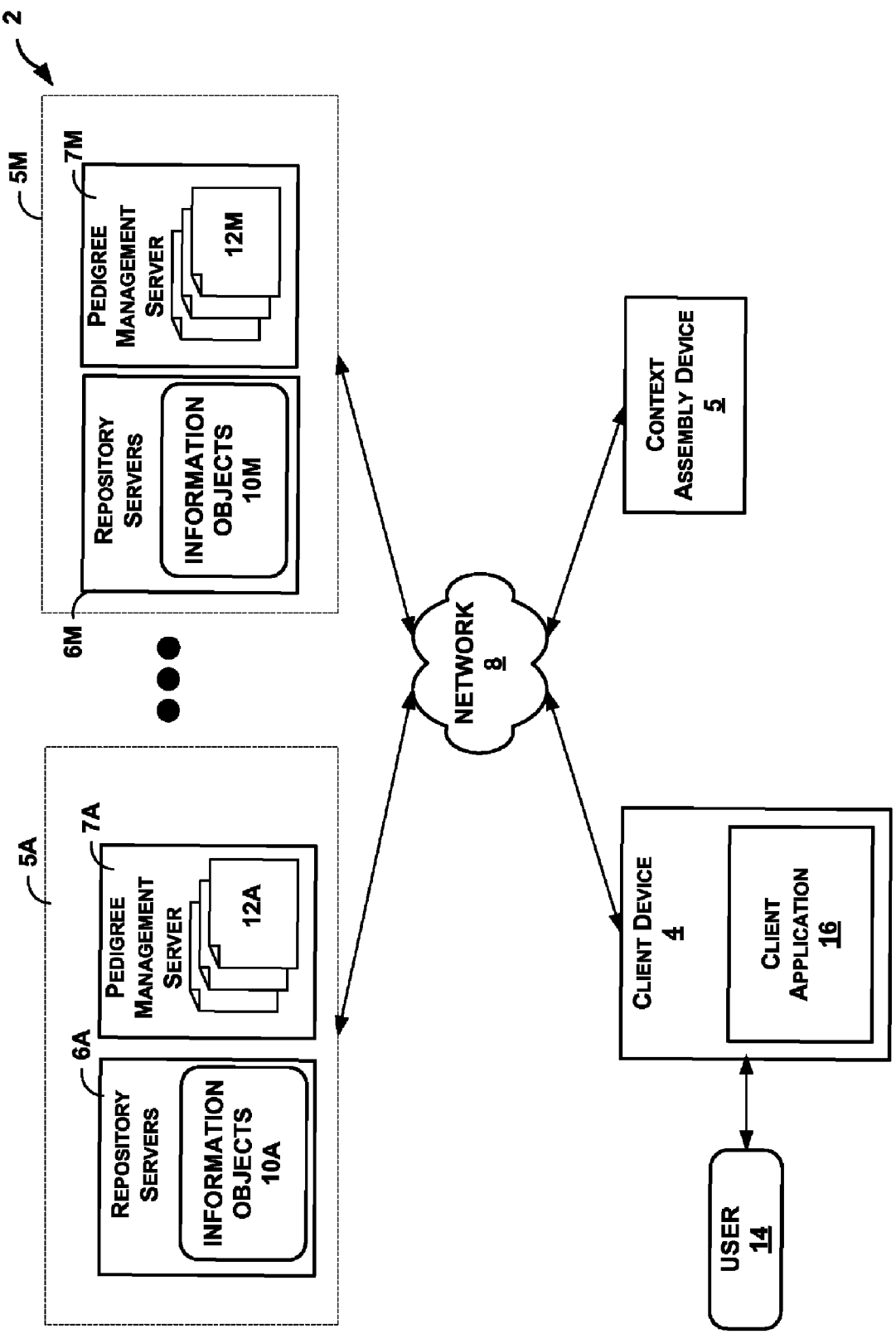
FIG. 1 is a block diagram illustrating an exemplary system for dynamically assembling and utilizing pedigrees of resources.

FIG. 1 is a block diagram illustrating an exemplary system 2 for dynamically discovering, assembling and utilizing pedigrees of resources. System 2 includes a client device 4 that represents any device by which a user 14 may request or access information. Client device 4 may be one of many different types of electronic devices. For example, client device 4 may be a personal computer, a laptop computer, a handheld computer, a mobile telephone, a server, a workstation, an intermediate network device, a data storage system, a supercomputer, a mainframe computer, a device built into a vehicle such as a truck, car, aircraft, watercraft, spacecraft, or other type of electronic device.

As illustrated in the example of FIG. 1, a human user 14 interacts with client device 4 in a typical fashion to communicate with, access, or otherwise utilize information contained within resources. As used in this disclosure, a "resource" is an instance of a concept and typically presents one or more asserted facts. For example, web sites, documents, and programs are all examples of resources. Moreover, these resources may be subdivided further into other resources. For example, a web site resource may contain web pages that are also viewed as resource; each web page may also contain many concepts that are also each separately identifiable as individual resources. In addition, the pedigree management and assessment techniques described and deployed within system 2 may be applied to resources external to the network, such as to manage the pedigree of people or other non-electronic resources.

As illustrated in the example of FIG. 1, system 2 includes at least one context assembly device 5. Context assembly device 5 dynamically assembles pedigrees of resources for subsequent utilization or assessment by client device 4. Context assembly device 5 may be a variety of different types of devices. For instance, context assembly device 5 may be a dedicated server, an intermediate network device or appliance, a personal computer, or another type of device. Furthermore, in some implementations, the functionality of context assembly device 5 may be incorporated into client device 4. In one embodiment, assembly device 5 is a dedicated pedigree management and assessment framework (PMAF) server.

In the example of FIG. 1, system 2 comprises a set of one or more network regions 5A-5M that may be geographically distributed and interconnected by network 8. That is, network 8 facilitates communication among network regions 5 and client device 4. Network 8 may be a wide area network spanning large distances, such as a proprietary network or the Internet, or may be a local area network, such as an Ethernet network, or otherwise. Furthermore, network regions 5 and network 8 may include a collection of wired and/or wireless network connections and may include dedicated lines, satellite links or other types of connections. Moreover, network regions 5 and network 8 may support a plurality of communications protocols. For example, network 8 may support a Transmission Control Protocol/Internet Protocol (TCP/IP) stack for processing network communications. In addition, communications on network 8 may or may not be secure.

As shown in the example of FIG. 1, each network region includes a set of one or more repository servers 6A through 6N (collectively, "repository servers 6"). Each of repository servers 6 generally represents any type of electronic devices that provides information related to resources to user 14 via the network. For example, repository servers 6 may be rack-mounted server devices, server blades, personal computers, network data centers, stand-alone servers, network file system servers, web servers, data storage systems, mainframe computers, and other types of devices. Moreover, repository servers 6 may be remote geographically distributed from one another. For example, repository server 6A may be in Europe and repository server 6B may be in Africa.

As shown in FIG. 1, repository servers 6A through 6M may be viewed as hosting sets of information objects that logically represent the different resources within network system 2. As noted above, example resources include web sites, documents, and programs, as well as concepts presented by or contained within those resources. As illustrated in the example of FIG. 1, repository servers 6A through 6M host information objects 10A-10M, respectively. Repository servers 6 makes information objects 10A-10N available to client device 4 and context assembly device 5 through network 8. This disclosure collectively refers to information objects 10A-10N as "information objects 10." In accordance with the techniques described herein, each of information objects 10 is associated with a unique Uniform Resource Identifier (URI) or other identifier for uniquely identifying each of the information objects 10. Similarly, non-electronic objects, such as people, can be represented by object identifiers that merely consist of a URI.

For instance, each of information objects 10 may be separate files in a file system, logical units in a database, identifiers that constitute resources. Some information objects, such as web pages, may include metadata that describes the other information stored in or asserted by the information object. As one example, one information object may uniquely identify a web page that contains a news report about the economy. The news report and certain identifiable concepts within the news report may each be viewed as separate information objects 10 and each assigned a unique identifier, e.g., URI.

In other words, the data of a given information object 10 may include many pieces of information at varying levels of granularity. Such pieces of information may individually be viewed as "resources." A "resource" is an instance of a tangible or intangible concept. Continuing the previous example, the web page of one information object 10A may be a resource, the body of the web page may be a resource, a statement in the web page may be a resource, and an individual word in the web page may be a resource. Each may be logically viewed as a separately information object having its own URI and traceable via the pedigree management and assessment techniques described herein. In another example, the concepts of "the Sun", "Buddhism", various asserted definitions of the verb "to run" may all be resources.

In addition to information objects 10, network regions 5 may include pedigree management servers 7A through 7M that store context objects 12A through 12M (collectively, "context objects 12"). For example, each of pedigree management servers 7 may store its respective set of context objects 12 as records within a database or other suitable data structure.

In general, context objects define relationships between resources represented by information objects 10. Although shown in the example of FIG. 1 as a first set of servers hosting information objects 10 and a second and distinct set of servers hosting context objects 12, the objects may be stored within a single set of servers. Furthermore, although not shown in the example of FIG. 1, one or more of context objects 12 may be stored as the metadata within information objects 10. For example, a context object 12 may be stored as metadata within a web page.

Context objects 12 may be information objects like information objects 10. In other words, context objects 12 are electronic objects that include metadata and payload data. The payload data of a context object comprises a set of statements. Each statement specifies a relationship between two resources. In general, the metadata of a context object 12 may comprise a list of URIs or other identifiers for the resources that are referred to in the set of statements in the payload data of the respective context object. The metadata of one of context objects 12 includes a URI of the resource specified as the subject in the statements in the payload data of the context object as well as a list of URIs for other resources specified within the statements the context object's payload data. Pedigree management servers 7 may use the metadata of context objects 12 to generate indexes that enable pedigree management servers 7 to easily identify context objects 12 in response to queries.

Statements in the payload data of context objects 12 may be formatted in a variety of ways. In one example, statements in the payload data of context objects 12 are formatted as Resource Description Framework (RDF) subject-predicate-object statements. RDF is a method of describing information by making statements about resources. According to the RDF specification, statements about resources take the form of subject-predicate-object statements. RDF subject-predicate-object statements may be formatted using RDF XML notation, Notation 3 (N3) notation, Terse RDF Triple Language (TURTLE), or another type of notation. A subject of an RDF subject-predicate-object statement denotes a first resource, an object denotes a second resource, and a predicate denotes a third resource that is associated with a relationship between the first resource and the second resource.

In an implementation where the statements in the payload data of context objects 12 are formatted as RDF subject-predicate-object statements, each resource is associated with a unique URI. The subject part of the RDF statement specifies a URI of a first resource, the predicate part of the RDF statement specifies a URI of a second resource, and the object part of the RDF statement specifies a third resource. For example, information object 10A may represent a web page, information object 10B may represent the concept of "is a source of", and information object 10C may represent another web page. Thus, in this example, a statement in the payload data of context object 12A specifies a URI of the web page represented by information object 10A as a subject, a URI of the concept "is a source of" represented by information object 10B as a predicate, and a URI of the web page represented by information object 10C as an object. This statement may unambiguously express the notion that the web page represented by information object 10A is a source of the web page represented by information object 10C.

Statements in the payload data of context objects 12 may describe "local" relationships between a resource and other resources. A statement that describes a "local" relationship with respect to a particular resource if the statement describes a provenance relationship in which the resource is specified as the subject of the relationship. For example, the payload data of information object 10A may include the news report about the economy. In this example, statements in context object 12A may describe local relationships between the news report of information object 10A and other resources, such as sources of the news report. For instance, the payload data of context object 12A may include a statement that specifies that "the news report is derived from a government survey" since the news report is the subject of the relationship specified by the context object. However, a second context object having a statement that "the government survey has census information as a source" does not describe a local relationship for the news report since the news report is not the subject of the specified relationship. That is, the second context object is one relationship away from information object 10A containing the new report and its relationship to the government survey. This example illustrates that provenance relationships of context objects can specify resources that are generated at different times than the subject of the statements in the context objects. However, that in many circumstances, statements do not imply temporal relationships between the resources. The statements in the payload data of context objects 12 may constitute statements that fall within the information contexts (i.e., pedigrees) of one or more resources. For this reason, this disclosure may refer to context objects as "context fragments" or "pedigree fragments" that may be assembled to form pedigrees for specific resources.

Resources identified as predicate elements of statements within context objects 12 may be resources from a commonly accepted ontology. As used in this disclosure, an ontology is a set of concepts within a domain and the relationship between those concepts. For example, resources identified as predicate elements of statements may be resources from the Dublin Core Metadata Element Set. The Dublin Core Metadata (DCM) Element Set includes the following resources: title, creator, subject, description, publisher, contributor, date, type, format, identifier, source, language, relation, coverage, and rights. In another example, resources identified as predicate elements of statements may be resources from the Defense Discovery Metadata Specification (DDMS).

Furthermore, resources identified as predicate elements in statements within context objects 12 may be custom resources that are specialized for particular purposes. For example, a court system that implements system 2 may define a resource that defines the relationship "cites statute." In this example, information object 10A may be an electronic document that is a legal opinion prepared by a judge that cites a particular statute, and information object 10C may include the particular statute. Furthermore, the court system may associate the legal opinion with a first URI, may associate the relationship "cites statute" with a second URI, and may associate the particular statute with a third URI. The one of context objects 12 that includes statements regarding the legal opinion may include a statement that expresses the notion that the legal opinion cites the statute by specifying the first URI as the subject, the second URI as the predicate, and the third URI as the object. In another example, a particular electronic anemometer to measure wind speed may exist at a particular location. The concept of this particular electronic anemometer is a resource and may be identified by a URI. In this example, context object 12A may include a statement that states the accuracy of the anemometer identified by the URI. For instance, the statement may specify that the anemometer reports the correct wind speed 95% of the time.

Repository servers 6 are able to generate new information objects, new context objects, and new resources. When one of repository servers 6 generates a new resource, the server may independently generate an identifier for the new resource that is unique among resource generated by the server. In other words, the server only needs to ensure that the identifier of the new resource is unique among resources generated by the server. Furthermore, each of repository servers 6 has a unique name or other identifier (e.g., HTTP domain name or a network address). For example, each of repository servers 6 may be associated with a unique Internet Protocol address or a unique domain name. A global unique URI of a resource may be a concatenation of the globally-unique identifier of the server with the locally-unique identifier generated by the server. In this example, repository server 6A may be associated with the domain name "http://www.example.com". Thus, the globally-unique URI of the resource may be "http://www.example.com/45", where "45" is the identifier assigned by repository server 6A to the resource.

In accordance with the techniques herein, a software application within system 2 that produces a resource is typically responsible for producing one or more context objects that stores statements that describe local relationships between the resource and other resources. However, in some circumstances, a third-party may tasked with producing a context object that stores statements that describe local relationships between a resource produced by another application and other resources. Production of context objects by third parties may be advantageous when the local relationships of resources are not produced with the resources. For example, a third party may produce a context object for a given publicly available web site.

At any time, client device 4 may request that context assembly device 5 dynamically assemble pedigrees of at least some resources represented by information objects 10. A pedigree of a resource is the set of statements that describe the provenance of the resource. For example, client device 4 may request that context assembly device 5 dynamically assemble a pedigree for a news report in order for user 14 to ascertain the trustworthiness of the facts asserted by the news report. In this example, context assembly device 5 may access repository servers 6 and determine that information object 10A includes the news report about the economy. Moreover, context assembly device 5 may determine that the payload data of context object 12A includes a statement that indicates that the news report is derived from an economic report written by an economist, and that the payload data of information object 10B includes the economic report written by this economist. Context assembly device 5 may further determine that the payload data of a second context object 12B includes a statement that indicates that the economic report is derived from a survey conducted by the government contained within information object 10C. In this example, the news report might not contain any reference to the government survey, yet the information in the news report is nevertheless based on information in the government survey. Context assembly device 5 assembles the pedigree of the news report in the form of a set of statements indicating that the news report is derived from the economic report written by the economist and that the economic report is derived from the survey conducted by the government. In this way, the pedigree assembled by context assembly device 5 indicates where the information in the news report came from (i.e., the provenance of the news report).

In this way, the techniques of this disclosure allow client device 4 to procure and utilize "information contexts" of resources. An "information context" of a resource is a set of statements that describe direct and/or indirect relationships between the resource and other resources. Given this definition, it is apparent that a pedigree can be viewed as a special type of an information context. For instance, statements in context objects 12 may include but are not limited to statements that describe relationships useful in describing the provenance of resources. In other words, statements in an information context may be forward-looking as well as backward-looking in time or may have no time implication at all. Because a pedigree of a resource is a particular type of information context of the resource, any pedigree can be described in terms of an information context. However, for purposes of clarity, the remaining examples in this disclosure are, unless otherwise noted, explained with reference to pedigrees.

As illustrated in the example of FIG. 1, client device 4 includes a client application 16 that accesses information objects 10 and may present information based on the information objects to user 14. For example, client application 16 may be a web browser, a stand-alone software application, an email program, or other type of software application. When client application 16 presents information based on one of information objects 10, client application 16 may allow user 14 to request that client application 16 perform an action that requires the use of a pedigree of a resource included in the information object. For example, if client application 16 presents a web page, client application 16 may display a "request source" button. When user 14 selects the "request source" button, client application 16 may request and subsequently receive a pedigree from context assembly device 5, such as described in the example above. User 14 may select the "request source" button by, for example, clicking on the button with a pointing device, entering a keyboard command, touching the "request source" button on a touch-sensitive monitor, depressing a special-purpose button, speaking a voice command, or providing another type of user input. After client application 16 receives the pedigree, client application 16 may use the pedigree to perform the action.

When context assembly device 5 receives a request for a pedigree of a primary resource, context assembly device 5 may use the URI of the primary resource to identify a uniform resource locator (URL) of a root pedigree of the primary resource. As used herein, a "primary" resource is the resource for which client device 4 has requested the pedigree. Furthermore, as used herein, the "root pedigree" of a resource is a set of statements that describe direct provenance relationships between the resource and other resources. For instance, in implementations where statements are expressed as RDF triples, the root pedigree of a resource is a set of statements in which the resource is a subject or an object and in which a provenance relationship is specified as the predicate.

The root pedigree of a resource may be stored in more than one context object. For example, if X is a URI of a resource, the root pedigree of the resource may include statements of the form: "X is derived from Y" and "Z is a source of X". In this example, the context object that stores the local relationships of resource X may store the statement of the form "X is derived from Y", but not the statement "Z is a source of X." Rather, in this example, the context object that stores the local relationships of resource Z stores the statement "Z is a source of X."

Context objects 12 do not necessarily store statements that indicate reciprocal relationships. For example, "derived from" and "source of" may be reciprocal relationships. In this example, a context object that stores the local relationships of resource X may not include the statement "X is derived from Y", but a context object that stores the local relationships of resource Y may include the statement "Y is a source of X." Because context objects 12 do not necessarily store statements that indicate reciprocal relationships, it may not be possible to use a context object that stores local relationships of a resource to identify all context objects that store statements in the root pedigree of the resource. For instance, in the previous example, the context object that stores local relationships of resource X provides no indication that resource Y is a source of resource X. Accordingly, the URL of a root pedigree of the primary resource may include a query string for context objects that include one or more statements that specify a relationship between the resource and the other resources.

After identifying the URL associated with the root pedigree of the primary resource, context assembly device 5 may use the URL associated with the root pedigree to output requests to pedigree management servers 7. In response to these requests, pedigree management servers 7A through 7M may provide to context assembly device 5 any of the context objects 12 that store sets of statements that refer to the primary resource. When context assembly device 5 receives the context objects, context assembly device 5 identifies among the statements in the received context objects, statements included in the root pedigree of the resource.

In one example implementation context assembly device 5 follows an iterative approach to dynamically assemble the requested pedigree. After context assembly device 5 identifies and receives context objects having statements that refer to the primary resource, context assembly device 5 applies a second-stage query to identify those statements that provide a first layer of pedigree information, i.e., those statements that refer to the resource as the subject of the statement. Context assembly device 5 then identifies any resources that are referred to as objects within those statements. Context assembly device 5 then issues a subsequent round of queries to pedigree management servers 7 to retrieve the next layer of pedigree information, i.e., statement in which the identified resources are referred to as the subject of the statements. This two-stage query process may then be repeated to assemble additional layers of pedigree information from the distributed pedigree management servers 7. In this way, the context assembly device 5 dynamically assembles the pedigree of the resource from disparate sources. The dynamically assembled pedigree may then be used in a variety of ways.

For example, after identifying a first set of context objects associated with a root pedigree of the primary resource, context assembly device 5 may then process the statements to identify URLs associated with root pedigrees a second set of resources, i.e. all resources referred to as objects in the statements. Context assembly device 5 may then output requests for, and subsequently receive, a second set of context objects that store statements that include statements in the root pedigrees of each resource in the second set of resources. Upon receiving the second set of context objects and/or statements, context assembly device 5 repeats the process to identify, among received statements, statements that constitute the root pedigrees of the resources in the second set of resources. After identifying the statements that constitute the root pedigrees of each resource in the second set of resources, context assembly device 5 may identify a third set of resources. The third set of resources may include the resources specified as objects by the statements of the root pedigrees of the resources in the second set of resources. Context assembly device 5 may then repeat this process until context assembly device 5 has identified the pedigree requested by client device 4. If the pedigree requested by client device 4 does not include all of the statements stored in pedigree management servers 7 that are in the pedigree of the primary resource, the requested pedigree is a "context subgraph" or the "pedigree subgraph" of the primary resource. because the subgraph is a subset of the whole pedigree graph for an object 10, which may go twenty hops (nodes) deep, whereas the client device 4 may request a pedigree graph of up to five hops deep. After context assembly device 5 identifies the pedigree requested by client device 4, context assembly device 5 may send the pedigree to client device 4.

When client device 4 receives the pedigree, client application 16 may use the pedigree to perform a wide variety of actions. Continuing the news report example, client application 16 may use a pedigree of the news report to assess or aid user 14 in assessing the trustworthiness of facts asserted within the news report. For instance, client application 16 may use statements of the pedigree to discover the provenance of the information in the news report. If client application 16 interprets government surveys to be particularly authoritative, client application 16 may provide a high trustworthiness assessment for the news report because client application 16 has used the pedigree of the news report to learn that the news report is based on the government survey. Alternatively, the pedigree of the news report may include one or more statements that indicate a new government survey replaces the government survey used as a source of the news report because the government made a serious error in the first survey. For this reason, in this example the report of the economist and the news report are based on faulty information. Client application 16 may use these statements to output a low trustworthiness assessment indicator of the news report to user 14.

In another example, the pedigree may indicate that a source for a requested document has been superseded by a newer version. This may require context assembly device 5 to query repository servers to follow backward pointers from the requested document to the source, and then to follow forward pointers from that source to the object replacing the source.

Client application 16 may use a pedigree of a resource in a wide variety of additional ways. For instance, client device 4 may use a pedigree of a resource to determine whether the resource was derived from secret information and should therefore not be distributed in order to verify the classification process before releasing the information to user 14. In yet another example, client device 4 may use an information context of a first court opinion to identify subsequent court opinions that cite the first court opinion (e.g., opinions that overrule the first opinion, opinions that favorably cite the first opinion, and other types of legal opinion).

The techniques described in this disclosure may provide one or more advantages. For example, the techniques may advantageously enable the statements that constitute a pedigree of a resource to be stored in a plurality of individual context objects distributed within one or more disparate, and possibly geographically separate servers. Storing the statements that constitute a pedigree of a resource in a plurality of individual context objects hosted by one or more servers avoids any requirement to store complete pedigrees of individual resources on a single server, which may reduce the complexity of the information stored on any individual one of the pedigree management servers 7.

In another exemplary advantage, a single statement in a single context object can be part of the pedigrees of multiple resources. Due to the techniques of this disclosure, it may not be necessary for the servers to store two separate copies of this statement in order to indicate that this statement is part of multiple pedigrees. This may conserve storage space within system 2. For example, in system 2, let a first information object represent the first draft of a document and let a second information object represent the second draft of the same document. The first draft and the second draft may be identical except that the second draft contains an extra paragraph. In this example, the pedigree of the first document and the pedigree of the second document are identical except that the pedigree of the second document also includes provenance information for resources in the extra paragraph. In other words, the pedigree of first document and the pedigree of the second document are almost completely redundant. In accordance with the techniques of this disclosure, there is no need to store an individual file to represent the entire pedigree of the first document and a separate individual file to represent the entire pedigree of the second resource. In this way, redundant information may be reduced.

Another exemplary advantage may arise from the fact that the techniques of this disclosure do not require the statements that constitute a pedigree of a resource to be stored in an information object that includes the resource. For instance, if a web page is a resource stored in a hypertext markup language (HTML) document (i.e., an information object), the techniques of this disclosure do not require the pedigree of the web page to be stored in the HTML document. Not including the pedigree in the HTML document may make the HTML document smaller and easier to transmit. Furthermore, when the pedigree is not included in the HTML document, the pedigree may not need to be assembled until the pedigree is actually requested.

As described, pedigree management servers 7 may store statements in discrete context objects 12 that, due to the metadata of the context objects, may be quickly and individually identified as containing relevant statements. For instance, pedigree management servers 7 may use the metadata of the context objects to generate indexes for efficient location and retrieval of the objects. Pedigree management servers 7 may then use these indexes to quickly find context objects that contain relevant statements. Using the indexes to quickly find context objects that contain relevant statements may narrow the field of possible statements that must be scanned through in order to identify the relevant statements. This may advantageously save considerable amounts of time and expenditure of computing resources.

In another exemplary advantage, the use of statements that define information contexts in the form of RDF statements may offer greater flexibility than the use of statements purely in the form of eXtensible Markup Language (XML) expressions. This is because XML expressions may require an XML schema in order to interpret statements formatted in XML. The use of RDF-formatted statements may obviate the need for such an XML schema. Furthermore, whereas XML represents a tree structure with a root node and nested layers, RDF represents a graph, with any resource connecting from and connecting to multiple resources. Because of this, system 2 may be able to record pedigrees and information contexts. That is, system 2 can represent a resource as being derived or composed from multiple resources as well as being used as a reference for multiple resources. In addition, RDF may allow ontological reasoning on identifiers. For an inter-domain information exchange, system 2 can be used to translate between the terminology and standards of the different domains. Using inference may allow for the possibility of storing large amounts of provenance data in a very compact form. For example, if a sensor produces thousands of reports, once every 10 minutes, it is not necessary to create pedigrees for each report. Instead RDF would allow a single statement of the form "All reports of type T were created by sensor S". This information would allow a pedigree for a particular report to be generated on the fly, as needed.

Furthermore, the use of RDF may be useful in circumstances where a source of a document is superseded by a new version. RDF enables devices to have consistent identifiers for resources. Context assembly device 5 may use RDF and such consistent identifiers to easily model and traverse the statements of the information context. For example, context assembly device 5 may easily query for all statements where a resource A is referred to as a subject of the statement and/or query for all statements where resource A is an object of the statement.

Figure 2:
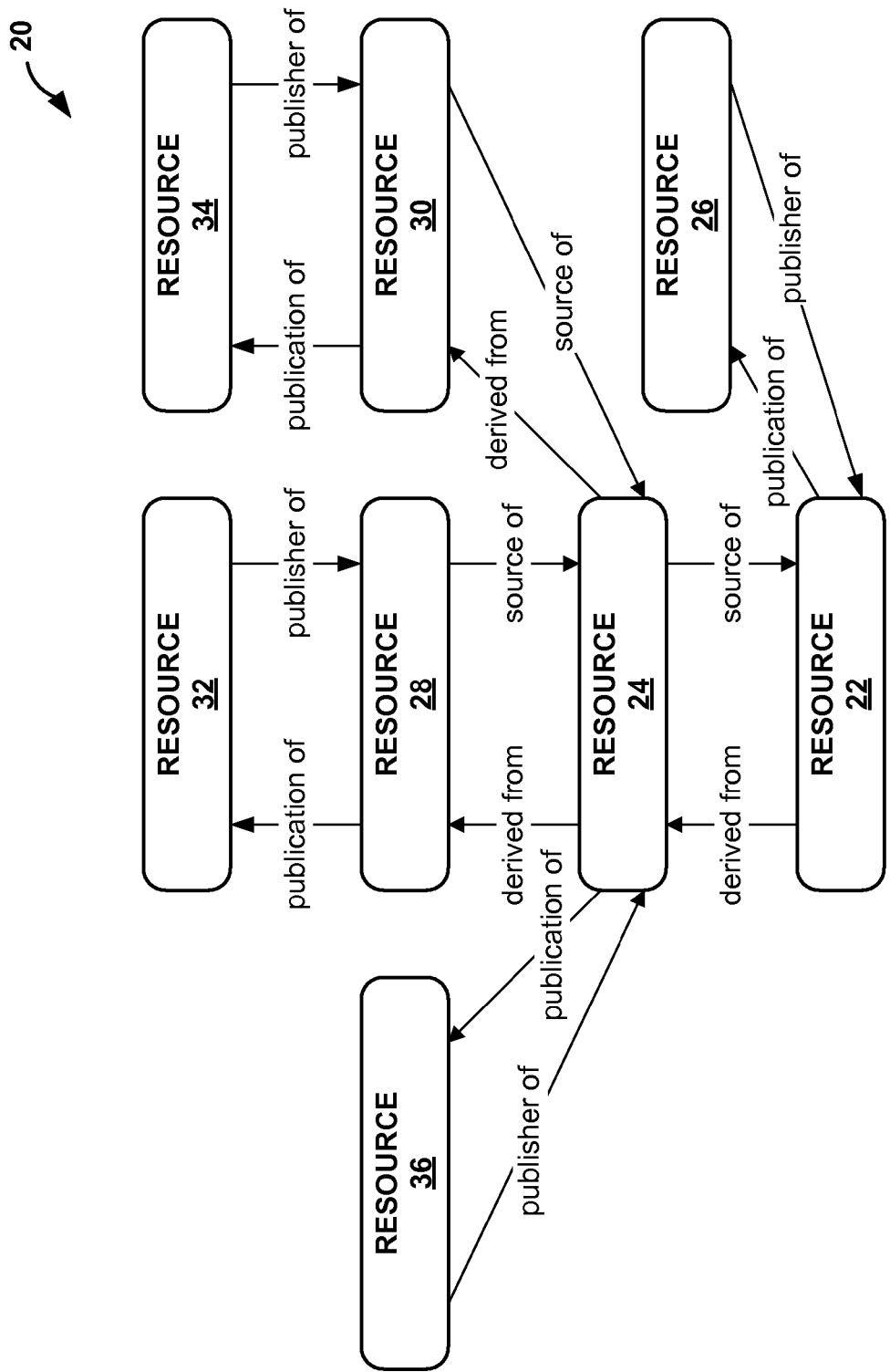
FIG. 2 is a block diagram illustrating an example model.

FIG. 2 is a block diagram that represents an example model 20 that reflects an exemplary arrangement for some of information objects 10 and context objects 12. A "model" is a set of statements representing relationships between the objects. A "model" is different than an information context because a "model" is not focused on statements that relate to a particular resource. A model may be visualized as a directed graph. Each "node" in the graph may represent a unique resource or a string literal identified by statements in the set of statements. Furthermore, two nodes in graph 20 coupled by an "arc" represent a statement in the set of statements and may be associated with the predicate of the statement. The source of an arc is the subject of a statement, the label of the arc is the predicate of the statement, and the target of the arc (i.e., what is pointed to by the arc) is the object of the statement. FIG. 2, described in detail below, illustrates a graphical representation of one example model.

As illustrated in the example of FIG. 2, model 20 is a set of fourteen statements. Each of the node-arc-node combinations in FIG. 2 represents a statement that expresses a relationship between resources described by the nodes. The statements of model 20 refer to eight unique resources 22-36.

In model 20, a statement indicates that resource 24 is a "source of," of resource 22. Furthermore, a statement indicates that resource 26 is a "publisher of" resource 22. Other statements indicate that resources 28 and 30 are "sources of" of information in resource 24 and that resources 32 and 34 are "publishers of" resources 28 and 30, respectively. Furthermore, a statement indicates that resource 36 is a "publisher of" of resource 24. Because resource 24 includes information from resources 28 and 30 and resource 36 is the publisher of resource 24, resource 36 may represent a publisher that accessed and merged information represented by resources 28 and 30.

In addition to the statements describing "source of" and "publisher of" relations, model 20 also includes statements describing "derived from" and "publication of" relations. "Derived from" and "publication of" relations are the inverses of "source of" and "publisher of" relations. In other words, if a "publisher of" relation indicates that a first resource represents a publisher of a second resource, then a corresponding "publication of" relation indicates that the second resource is a publication of the first resource. For instance, resource 22 is a "publication of" resource 26. It should be noted that many graphs do not include reciprocal relationships, such as those shown in FIG. 2 for purposes of example. Including such reciprocal relationships may, in some circumstances, be redundant and, consequently, constitute a waste of storage space and processing time.

Model 20 may represent an information context of resource 22 based on the "source of", "derived from", "publisher of", and "publication of" relationships. For example, suppose that resource 22 is an alert to a pilot of an aircraft that an airport runway is icy. In this example, the pilot may want to know whether the alert is accurate. For this reason, the pilot may request an assessment of the trustworthiness of the alert. In order to perform this assessment, a client device on the aircraft may obtain model 20. After obtaining model 20, the client device may use model 20 to assess the trustworthiness of the alert. For instance, resource 32 may represent a thermometer and resource 34 may represent an air humidity detector at the airport. The thermometer outputs the current air temperature as resource 28 and the air humidity detector outputs the current air humidity as resource 30. In other words, the thermometer (resource 32) is the publisher of the current air temperature (resource 28) and the current air temperature (resource 28) is a publication of the thermometer (resource 32). Furthermore, the air humidity detector (resource 34) is the publisher of the current air humidity (resource 30) and the current air humidity (resource 30) is a publication of the air humidity detector (resource 34). In addition, resource 36 may represent a software program that automatically uses the current air temperature (resource 28) and the current air humidity (resource 30) to determine whether the current air temperature is below 32 degrees Fahrenheit and whether the current air humidity is close to 100%. In this scenario, resource 36 may output resource 24 to indicate that ice may be forming on the runways of the airport. In other words, resource 36 is the publisher of the indication that ice may be forming (resource 24) and the indication that ice may be forming (resource 24) is a publication of the software program (resource 36). Resource 26 may use resource 24 to automatically generate resource 22 (i.e., the alert that informs pilots of aircraft flying to the airport that the runways may be icy).

Each one of resources 22-36 may or may not be included in the payload data of information objects 10. For example, resource 22 may be included in information object 10A. However, resource 32 (the thermometer) is not included in one of information objects 10 because resource 32 is a physical thermometer existing in the real world.

Each one of the resources in model 20 may be associated with one of context objects 12. In other words, for each resource in model 20, there is a context object that includes statements that describe local relationships between the resource and other resources. For example, context object 12A may include statements that describe local relationships between resource 22 and other resources. In this example, context object 12A may include a statement that indicates that resource 22 is "derived from" resource 24 and a statement that indicates that resource 22 is a "publication of" resource 26.

To illustrate how context assembly device 5 may dynamically assemble a pedigree of resource 22, consider the following example. Assume that context assembly device 5 receives a request for a pedigree of resource 22. This request may specify that the pedigree should only include "derived from" and "publication of" relationships. When context assembly device 5 receives this request, context assembly device 5 may initially use first stage queries to retrieve from pedigree management servers 7 context objects that include statements that specify resource 22 as a subject. In the example of FIG. 2, the context objects that include statements that specify resource 22 include a first context object that includes local relationships of resource 22, a second context object that includes local relationships of resource 24, and a third context object that includes local relationships of resource 26. Next, context assembly device 5 may use a second-stage query to identify statements in the first context object that specify one of the required relationships and that specify resource 22. In this case, the statement "resource 22 is derived from resource 24" and the statement "resource 22 is a publication of resource 26" are statements that specify one of the required relationships and that specify resource 22 as a subject. After identifying these statements, context assembly device 5 may add these statements to the requested pedigree. Similarly, context assembly device 5 may receive use a second-stage query to identify statements in the second context object and the third context object that specify one of the required relationships and that specify resource 22. However, in the example of FIG. 2, the second context object and the third context object do not include any statements that specify one of the required relationships and that specify resource 22.

After context assembly device 5 identifies that statements "resource 22 is derived from resource 24" and the statement "resource 22 is a publication of resource 26", context assembly device 5 may determine whether the local pedigree of resource 24 or the local pedigree of resource 26 are needed in order to assemble the requested pedigree. If context assembly device 5 determines that the local pedigree of resource 24 is needed in order to assemble the requested pedigree, context assembly device 5 may output first-stage queries to pedigree management servers 7 for context objects that include statements that specify resource 24. In response to these first-stage queries, pedigree management servers 7 may provide to context assembly device 5 a fourth context object that includes local relations of resource 28, a fifth context object that includes local relations of resource 30, a sixth context object that includes local relations of resource 36. In addition, pedigree management servers 7 may provide to context assembly device 5 the second context object. After receiving the second, fourth, fifth, and sixth context objects, context assembly device 5 may use second-stage queries to identify statements in the second, fourth, fifth, and sixth context objects that specify one of the required relationships and that specify resource 24.

Subsequently, context assembly device 5 may determine whether the root pedigrees of resource 28, resource 30, or resource 36 are needed in order to complete the requested pedigree. If so, context assembly device 5 may repeat the procedure outlined in the preceding paragraph for resource 28, resource 30, and/or resource 36.

Figure 3:
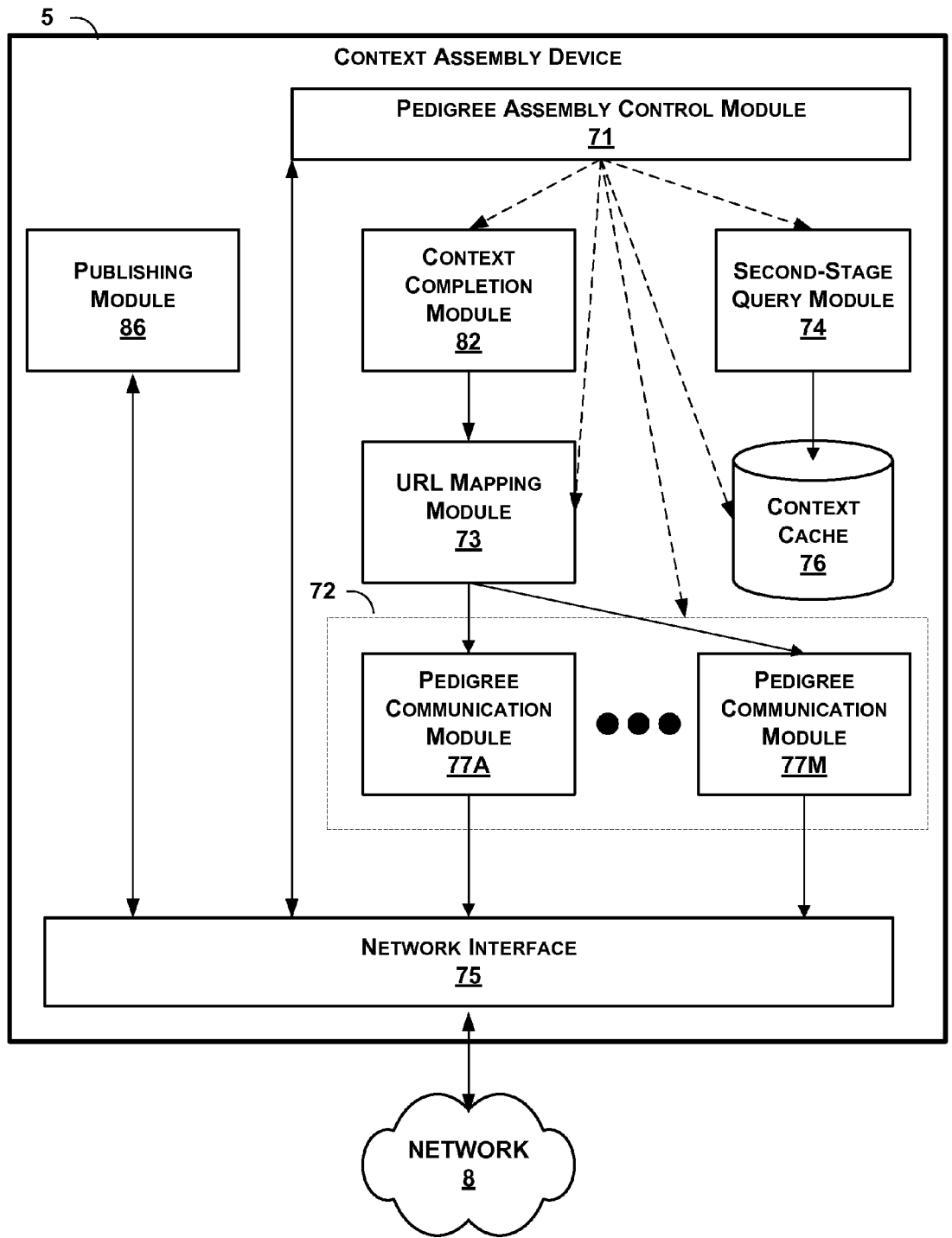
FIG. 3 is a block diagram that illustrates example details of a context assembly device in the information context system.

FIG. 3 is a block diagram that illustrates example details of context assembly device 5 in system 2. As illustrated in the example of FIG. 3, includes a pedigree assembly control module 71 that provides high-level control logic for invoking other software modules of context assembly device 5, including a first-stage query module 72 having pedigree communication modules 77 for generating a set of first-stage queries, a URL mapping module 73, a second stage query module 74 and a context completion module 82. Pedigree assembly control module 71 may be implemented as an instantiation of an object-oriented software class or classes designed for pedigree management and assessment.

Context assembly device 5 includes a network interface 75 for communication with other network-enabled devices. Network interface 75 may be an Ethernet interface, a fiber optic network interface, a WiFi interface, a WiMax interface, a Bluetooth interface, or another type of network interface. In an alternate implementation, context assembly device 5 may include a serial or parallel communication interface (e.g., Universal Serial Bus, FireWire, etc.) that performs similar communications as network interface 75.

Network interface 75 receives from client device 4 a request for a pedigree of a particular resource. For purposes of explanation, this disclosure refers to the resource for which client device 4 is requesting the pedigree as the "primary resource." The request for the pedigree of the primary resource may specify a URI of an information object that represents the primary resource. For example, if the information object is a web page, client device 4 may output a request to context assembly device 5 that specifies the URL of the web page within system 2. In addition, the request for the pedigree of the primary resource may specify one or more parameters that define the pedigree that client device 4 is requesting. For instance, the parameters may specify a "scope" of a pedigree. As used in this disclosure, the "scope" of a pedigree of a resource indicates how many relationships are in a shortest sequence of relationships between the resource and any other resource specified by a statement in the pedigree. In yet another example, the parameters of the request may specify the types of relationships that are to be included in the pedigree. In this example, the parameters may specify that only relationships that specify the relationship "X is derived from Y", where X and Y are URIs associated with resources, may be included in the pedigree or information context. In one example, the request output by client device 4 may take the form of an HTTP message that specifies the exemplary parameters described above When network interface 75 receives the request from client device 4 for a pedigree of the primary resource, a URL mapping module 73 in context assembly device 5 extracts the parameters from the request and produces a URL associated with the root pedigree of the primary resource. URL mapping module 73 may store, update and utilize a mapping between URLs of information objects 10 and URLs associated with root pedigrees of resources represented by the information objects. URL mapping module accesses the map using the primary resource specified by the request as an input (e.g., a key) to identify and select a URL associated with the root pedigree of the primary resource. URL mapping module 73 that maps URLs of information object names to the URLs corresponding to root pedigrees of resources may provide a pluggable framework in which modular components can be plugged into to accommodate new types of information object repositories.

In one example, URL mapping module 73 may generate a URL associated with a root pedigree of a resource to include and specify a query string that describes a query for context objects that include one or more statements that specify a relationship between the primary resource and other resources. In accordance with one exemplary implementation, URLs of root pedigrees of resources may have the form:

oim://<server name>/<object type>/<object version>/ ?<metadata query string>

In this exemplary implementation, the "<server name>" portion of a URL associated with a root pedigree of a resource may specify a domain name associated with a pedigree management server that hosts a pedigree information for the resource (e.g., context objects), such as one of pedigree management servers 7. Furthermore, the "<object type>" and "<object version>" portions of the URL associated with the root pedigree of the resource may identify the particular context objects associated with the resource. In addition, the "<metadata query string>" portion of the URL may be a query string that enables pedigree management servers 7 to identify context objects that store statements that specify the primary resource as either a subject or object. In other words, this portion of the query string defines a query for identifying any context objects that include one or more statements that specify a relationship between the primary resource and other resources. In one instance, the query string may specify a URI of the primary resource. In this instance, it is important to appreciate that the URI of the resource is distinct from the URL of the root pedigree of the primary resource.

After identifying the URL associated with the root pedigree of the primary resource, URL mapping module 73 provides the URL associated with the root pedigree of the primary resource to a set of pedigree communication modules 77A through 77N (collectively, "pedigree communication modules 77"). Each of pedigree communication modules 77 may be specialized to communicate with one or more of pedigree management servers 7. When one of pedigree communication modules 77 receives a URL associated with a root pedigree, the repository communication module generates a first-stage query that can be interpreted by one or more of pedigree management servers 7 for identifying and retrieving the relevant context objects. For example, if pedigree management server 6A is a Structured Query Language (SQL) server, repository communication module 77A may formulate a SQL query. In another example, repository communication module 77M may be specialized to communicate with pedigree management server 6M. In this example, repository communication module 77N may formulate a SPARQL Protocol And RDF Query Language (SPARQL) query, a Versa query, and RDF Query Language (RDQL) query, or another type of query that directly identifies statements stored in context database 18. In this manner, the queries formulated by pedigree communication modules 77 are specialized first-stage queries that request all context objects that include one or more statements that specify a direct relationship between the primary resource and other resources. After formulating the first-stage queries, pedigree communication modules 77 communicates the queries to pedigree management servers 7.

Subsequently, network interface 75 may receive from one or more of pedigree management servers 7, in response to the first-stage queries, all context objects that store statements that specify relationships between the resource and other resources. In many cases, pedigree management servers 7 may return context objects that are formulated in different ways. For example, pedigree management server 7A may store context objects in which pedigree statements in RDF format are embedded in XML, pedigree management server 7B may store context objects and their pedigree statements in a database, and pedigree management server 7C may store context objects and their pedigree statements embedded in HTML or another format of metadata for a particular document type. Pedigree communication modules 77 are specialized to query the different pedigree management servers 7 and extract the RDF statements from the different formats. In order to accommodate such differences, pedigree communication modules 77 may transform a context object that is in a non-standard format into a standard format.

When context assembly device 5 receives context objects that store statements that include statements in the root pedigree of a resource, pedigree assembly control module 71 may further invoke a second-stage query module 74 to identify those statements in the received context objects that are relevant to the pedigree requested by client device 4. In other words, second-stage query module 74 may further process the received context objects to pare down the statements in the context objects to only those statements that are necessary for producing the pedigree of the primary resource specified by client device 4.

In one example implementation, in order to identify statements in the context object that are relevant to the pedigree requested by client device 4, second-stage query module 74 may formulate one or more queries and apply the queries directly to the statements contained in the received context objects. The second-stage query may be formatted in any of several query languages such as SPARQL, SQL, Versa, RDQL, and other such query languages to access context cache 76. After second-stage query module 74 generates the reconstructed statements, second-stage query module 74 may store the identified statements into a context cache 76 for future use.

In another example, the statements received from the first-stage query are unfiltered and are inserted directly into context cache 76 without culling. The second-stage query is then applied to the context cache 76, as discussed below, to extract the context objects relevant for producing the requested pedigree.

In general, context cache 76 is organized as a hash structure in which each bin of the hash stores a first layer of information context, i.e., a set of local relationships for a particular resource. In one implementation, context cache 76 may be implemented as a set of two main thread-safe hash maps: (i) a hash map for storing sets of context object statements keyed by the URIs of the statements' subjects, and (ii) a hash map for storing sets of context object statements keyed by their URI of the statements' objects, i.e., descendancy statements about the keyed object Each statement of the unfiltered context objects received in response to the first-stage query is processed and inserted into the hash maps. That is, each statement of the context objects is added to the first hash map using the URI of the subject as a hash key and added to the second hash map using the object of the statement as the hash key.

Subsequently, in this example, second-stage query module 74 may identify statements in a root pedigree of a resource by generating a second-stage query and applying the query to the context cache 76. For example, second-stage query module may access any pedigree statement in context cache using the key pairs (the hash of the URI of the subject of the statement pedigree, the hash of the URI of the object of the statement for descendancy). Second-stage query module 74 may then scan through the statements in the retrieved context objects, identifying the statements in the root pedigree of the resource. This technique described in this example may be advantageous in implementations in which pedigree assembly control module 71 accesses context cache 76 to determine whether it contains relevant entries for context objects of a pedigree prior to sending first-stage queries to pedigree management servers 7.

Each entry in context cache 76 may be timestamped, and a cache maintenance thread may periodically remove entries from the hash tables after given amounts of time have passed.

Pedigree assembly control module 71 may store the statements in context cache 76 in such a way that the statements may be used as if they were a single model. Because pedigree assembly control module 71 stores the statements into context cache 76 in such a way that the statements may be used as if they were a single model, this disclosure may also refer to pedigree assembly control module 71 as a "pedigree assembler" or a "context assembler." Context cache 76 may be a data structure implemented in persistent or volatile memory. For example, context cache 76 may be implemented as one or more files on a hard disk drive, in a RAM unit, some combination or persistent or volatile memory, or other storage mechanism.

After the statements are identified by the second-stage query module 74, pedigree assembly control module 71 invokes a context completion module 82 to determine whether further layers of pedigree information are needed to complete the pedigree for the primary resource. That is, pedigree completion module 82 determines whether the root pedigrees for resources specified by the statements identified by the second-stage query are not contained within context cache 76 and are needed to complete the pedigree of the primary resource.

If context completion module 82 determines that the root pedigrees of resources specified by the identified statements are needed to complete the pedigree of the primary resource, context completion module 82 may provide to URL mapping module 73 the URI of each resource specified as objects in the identified statements. When URL mapping module 73 receives a URI of a resource, URL mapping module 73 may identify a URL associated with a root pedigree of the resource. After identifying the URL associated with the root pedigree of the resource, URL mapping module 73 may provide the URL associated with the root pedigree of the resource to pedigree communication modules 77. Pedigree communication modules 77 may then use the URL associated with the root pedigree of the resource to generate a query that is appropriate for use with respective ones of pedigree management servers 7. After generating the queries, pedigree communication modules 77 may send the queries to respective ones of pedigree management servers 7. When context assembly device 5 receives sets of context objects in response to these queries, context assembly device 5 may process each of the sets of context objects in the manner described herein with regard to the root pedigree of the primary resource.

If context completion module 82 determines that the root pedigrees of resources specified by the identified statements are not needed to complete the pedigree of the primary resource, context completion module 82 may determine whether all root pedigrees requested by pedigree communication modules 77 have been received. If all root pedigrees requested by pedigree communication modules 77 have been received, context completion module 82 may cause network interface 75 to output the requested pedigree to client device 4. On the other hand, if not all root pedigrees requested by pedigree communication modules 77 have been received, the components of context assembly device 5 may not perform additional actions until network interface 75 receives a set of context objects that include statements that describe relationships between one of the identified resources and other resources.

Differing organizations may use differing resources to refer to similar concepts. For example, a first organization may use a statement that indicates that a first animal is a "marine mammal." A second organization may use a statement that indicates that a second animal is "ocean-dwelling mammal." In this example, client device 4 may request an information context for a resource that includes all animals that live in the ocean. This information context may be incomplete if the information context does not include animals that are "marine mammals" and animals that are "ocean-dwelling mammals."

To ensure that the information context includes statements that use differing terminology to refer to similar resources, the first-stage query module 72 and second-stage query module 74 may use reasoning to identify resources that have the same semantic meaning. For example, each organization may maintain an ontology that defines each of the resources used as predicates by the organization. These ontologies may be Web Ontology Language (OWL) ontologies. An OWL ontology comprises a set of RDF statements that describe the ontological properties of resources.

If resources in one or more ontologies share the same ontological properties, the resources may be interpreted to have the same semantic meanings. For example, a first ontology may include a first RDF statement that indicates that a "marine mammal" has the ontological property of being a "mammal" and a second RDF statement that indicates that a "marine mammal" has the ontological property of being "adapted to live in the ocean." Furthermore, a second ontology may include a first RDF statement that indicates that an "ocean-dwelling mammal" has the ontological property of being a "mammal" and a second RDF statement that indicates that an "ocean-dwelling mammal" has the ontological property of being "adapted to live in the ocean." Because the RDF statements indicate that "marine mammal" and "ocean-dwelling mammal" have the same ontological properties, the "marine mammal" resource and the "ocean-dwelling mammal" resource may be interpreted to have the same semantic meaning.

In order to identify other resources that have the same semantic meaning as a particular resource, second-stage query module 74 may formulate a second-stage query that identifies each ontological property of the particular resource. After receiving the ontological properties for the resource, second-stage query module 74 may formulate a second-stage query that identifies each resource that has all of the identified ontological properties. If repository management module 80 returns no results for this query, second-stage query module 74 may formulate second-stage queries for each ontological property of each ontological property of the particular resource. Second-stage query module 74 may continue this process until second-stage query module 74 determines that there are no other resources that have the same ontological properties. When second-stage query module 74 has identified resources that have the same semantic meaning, second-stage query module 74 may formulate second-stage queries that include each of the identified resources.

As shown in FIG. 3, context assembly device may further include a publishing module 86 to allow client applications to publish context objects for new information objects as resources are produced without requiring that the client applications know the format of the context objects or where it will be stored within system 2. Publishing module 86 updates the modular mapping between URIs of information objects and the URLs of context objects as resources are produced and presented to system 2 for storage.

Figure 4:
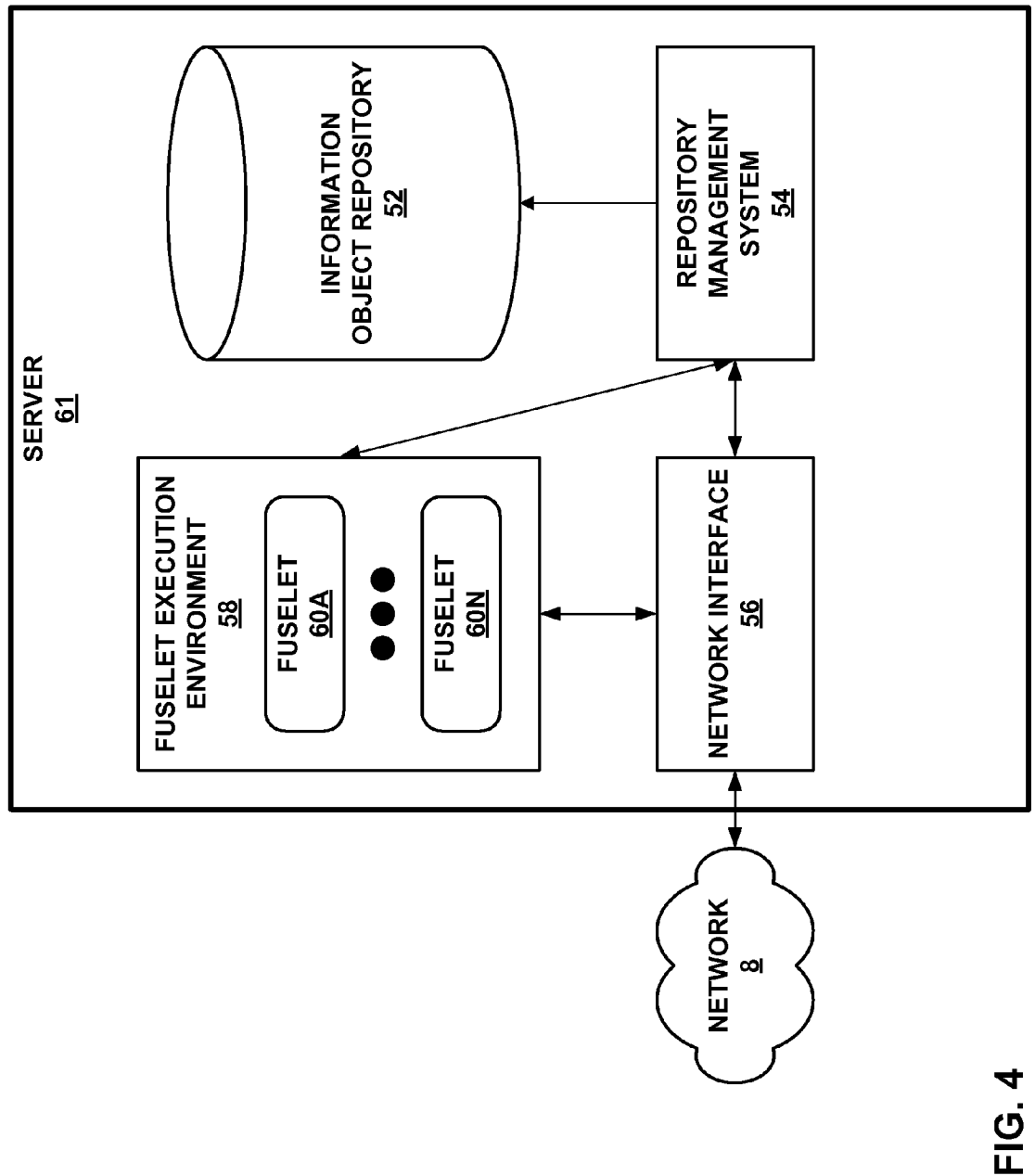
FIG. 4 is a block diagram that illustrates example details of a server in the information context system.

FIG. 4 is a block diagram that illustrates one example implementation in which a server 61 that, for sake of illustration, combing functional elements for hosting information objects 10 and managing context objects 12. As illustrated in the example of FIG. 4, server 61 includes an information object repository (IOR) 52 that may store information objects in a persistent or volatile computer-readable medium. IOR 52 may be implemented as a file system, a relational database, an object-oriented database, an associative database, or another type of information repository. Server 61 also includes a repository management system 54 that organizes, stores, and retrieves data in IOR 52. Repository management system 54 may be a software application such as a file system manager included in an operating system such as Microsoft Windows, Macintosh OSX, Linux, or another operating system. Alternatively, if IOR 52 is a relational database, repository management system 54 may be a software application such as MySQL from MySQL AB of Uppsala, Sweden, Microsoft SQL Server from Microsoft Corporation of Redmond, Wash., Oracle from Oracle Corporation of Redwood Shores, Calif., or another type of database management software application.

As discussed above, the metadata of information objects 10 and the metadata of context objects 12 may specify URIs associated with resources specified as objects in statements included in the payload data of context objects 12. Repository management system 54 may use the URIs in the metadata to generate an index that may be quickly and easily searched. When server 61 receives a query from context assembly device 5 during the first stage, repository management system 54 may use the index to identify ones of context objects 12 in IOR 52 that have metadata that include URIs that match URIs indicated by the query. When repository management system 54 identifies the context objects, repository management system 54 may use network interface 56 to transmit the identified context objects to context assembly device 5 using network 8.

Database management system 54 may receive information objects for storage in IOR 52 from other devices in system 2 via network interface 56. For example, client device 4 and/or context assembly device 5 may send a context object to database management system 54 for inclusion in IOR 52.

In some example deployments, repository server 6A may also include a fuselet execution environment 58. As illustrated in the example of FIG. 4, fuselet execution environment 58 provides an operating environment in which fuselets 60A through 60N (collectively, "fuselets 60") may execute. A "fuselet" is a computer program that performs a transformation on information from one or more sources to generate one or more new information objects. For example, fuselets 60 may be Java Managed Beans and fuselet execution environment 58 may be a Java Virtual Machine. Fuselets 60 may be "publishers" of information objects. For example, fuselet 60A may apply an eXtensible Stylesheet Language Transformation (XSLT) on information from an XML document included in a first one of information objects 10 and an XML document included in a second one of information objects 10 to generate a new information object. XSLT is a Turing complete XML-based language used for the transformation of XML documents.

In addition to generating new information objects, fuselets 60 may update context objects or generate new context objects associated with the new information objects. For example, when fuselet 60A generates a new information object, fuselet 60A may update a context object in IOR 52 to include a new statement that indicates that fuselet 60A is a publisher of the new information object. In this example, fuselet 60A does not create a new context object for the new information object, rather fuselet 60A updates a context object that includes statements that indicate each information object published by fuselet 60A. In another example, when fuselet 60B generates a new information object, fuselet 60B may generate a new context object in IOR 52. The metadata of this new context object may indicate that the payload data of the new context object includes statements regarding the new information object. The payload data of this new context object may include a metadata expression that indicates that fuselet 60B is a publisher of the new information object. In another example, fuselets 60 may not create a context object for an information object unless repository server 6A receives a query for this context object.

Each of fuselets 60 may be associated with one or more context objects in IOR 52. A context object associated with one of fuselets 60 may include statements regarding the fuselet. For example, payload data of a first context object may include a first statement that indicates that fuselet 60A performs a particular XSLT transform, a second statement that indicates that a first resource is a source of information objects generated by fuselet 60A, and a third statement that indicates that a second resource is a source of information objects generated by fuselet 60A. In this example, a second context object may include statements that indicate that fuselet 60A is a publisher of particular information objects. The first context object may include statements regarding fuselet 60A that are unlikely to change, whereas the second context object may include statements regarding fuselet 60A that are likely to change whenever fuselet 60A generates a new information object.

Figure 5:
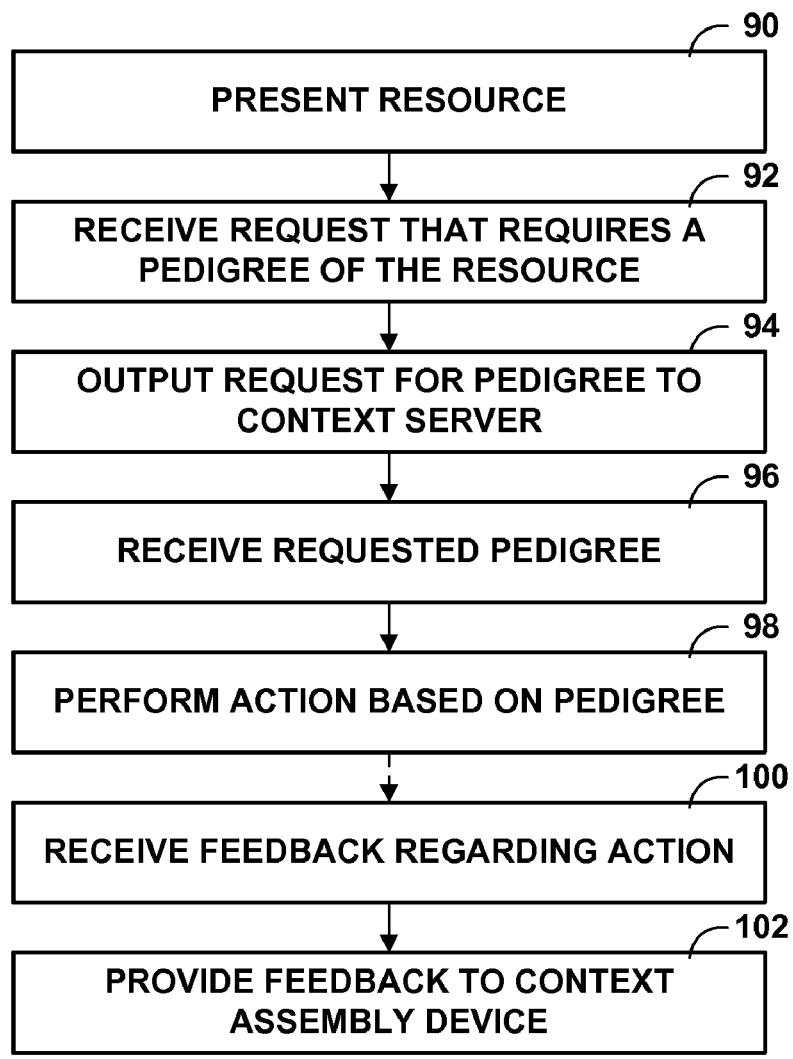
FIG. 5 is a flowchart illustrating an example operation of the client device to use a pedigree.

FIG. 5 is a flowchart illustrating an example operation of client device 4 to use a pedigree of a resource. Initially, client application 16 in client device 4 presents a primary resource (90). For example, client application 16 may present a web page. Next, client application 16 may receive a request from user 14 to perform an action that requires a pedigree of the primary resource (92). In the previous example, user 14 may request a trustworthiness evaluation of the web page because user 14 might not believe that a fact presented in the web page is true.

After client application 16 receives the request to perform an action that requires a pedigree for the primary resource, client device 4 may output a request to context assembly device 5 (94). The request may specify the URI of the primary resource in accordance with a relevant protocol for accessing the resource. For example, if the resource is a web page associated with the URI "http://www.example1.com/webpage1.html", client device 4 may output a request to context assembly device 5 that specifies the URI "http://www.example1.com/webpage1.html". Other protocols would be defined for other data stores.

In addition, the request may specify one or more parameters that indicate what type of information should be included in the pedigree. These parameters may specify the types of relationships to be included in the pedigree. For example, the request may specify that the pedigree should include statements that specify the relationships "derived from" and "published by". In addition, these parameters may specify a scope of the pedigree. The "scope" of a pedigree of a resource indicates how many direct relationships are in a shortest sequence of direct relationships between the resource and any other resource specified by a statement in the pedigree. For example, the request may specify a parameter that indicates that the shortest sequence of relationships between the primary resource and any other resource specified by a statement in the pedigree must be less than 3. In this example, if A is the original resource, the information context could include the statements "A is derived from B" and "B is derived from C", but could not include the statement "C is derived from D" because "C is derived from D" specifies a resource that is separated from A by more than two direct relationships.

After client device 4 outputs the request, client device 4 may subsequently receive the requested pedigree from context assembly device 5 (96). When client device 4 receives the requested pedigree, client device 4 may use the pedigree to perform the action (98).

For example, when client device 4 receives the requested pedigree of the primary resource, client device 4 may use the pedigree to evaluate the trustworthiness of the primary resource. In order to evaluate the information context, client application 16 may parse the pedigree, determine whether the pedigree meets one or more evaluation criteria, and then return a trustworthiness value that indicates a level of trustworthiness of the resource. A low trustworthiness value may indicate low trustworthiness and a high trustworthiness value may indicate high trustworthiness. After determining the trustworthiness value, client application 16 may present a warning when the results indicate that a resource has low reliability. Client device 4 may present the trustworthiness value on a screen, generate a sound that conveys the trustworthiness value, or otherwise inform user 14 of a reliability score. In another example, client device 4 may store information, cause the use of robotics, or perform another type of action based on the pedigree. For example, in the icy runway example described in regards to FIG. 2 above, client device 4 may automatically deploy de-icing chemicals onto the wings of the aircraft when the statement indicating that ice is forming at the airport has a high trustworthiness score.

In another example, client application 16 may use the pedigree to determine whether the primary resource is based on information that is meant to be kept secret. In this example, client application 16 may prevent user 14 from seeing the primary resource unless user 14 presents certain security credentials. In another example, an organization might have a policy that its employees only use information from certain sources. In this scenario, client application 16 might use the pedigree to prevent user 14 from using information other than those sources.

Furthermore, in the example of FIG. 5, client device 4 may receive feedback regarding the action (100). For instance, if client device 4 uses the pedigree of the primary resource to evaluate the trustworthiness of the resource, user 14 may independently verify the trustworthiness of the resource. In this instance, client device 4 may receive feedback from user 14 regarding the results of the user's independent verification of the trustworthiness of the resource. In the icy runway example, the pilot may provide feedback indicating that, in spite of the resource stating that ice was forming on the runway, ice was not actually forming on the runway. When client device 4 receives feedback regarding the action, client device 4 may output the feedback to context assembly device 5 (102). Context assembly device 5 may apply the feedback by updating statements in one or more of context objects 12.

It should be appreciated that providing feedback is only one example of an action that client device 4 may perform after client device 4 uses the pedigree of the primary resource to perform an action. For instance, after client device 4 uses the pedigree to perform an action, client device 4 may receive a request for a more detailed pedigree. In this instance, client device 4 may output a request to context assembly device 5 for the more detailed pedigree.

Figure 6:
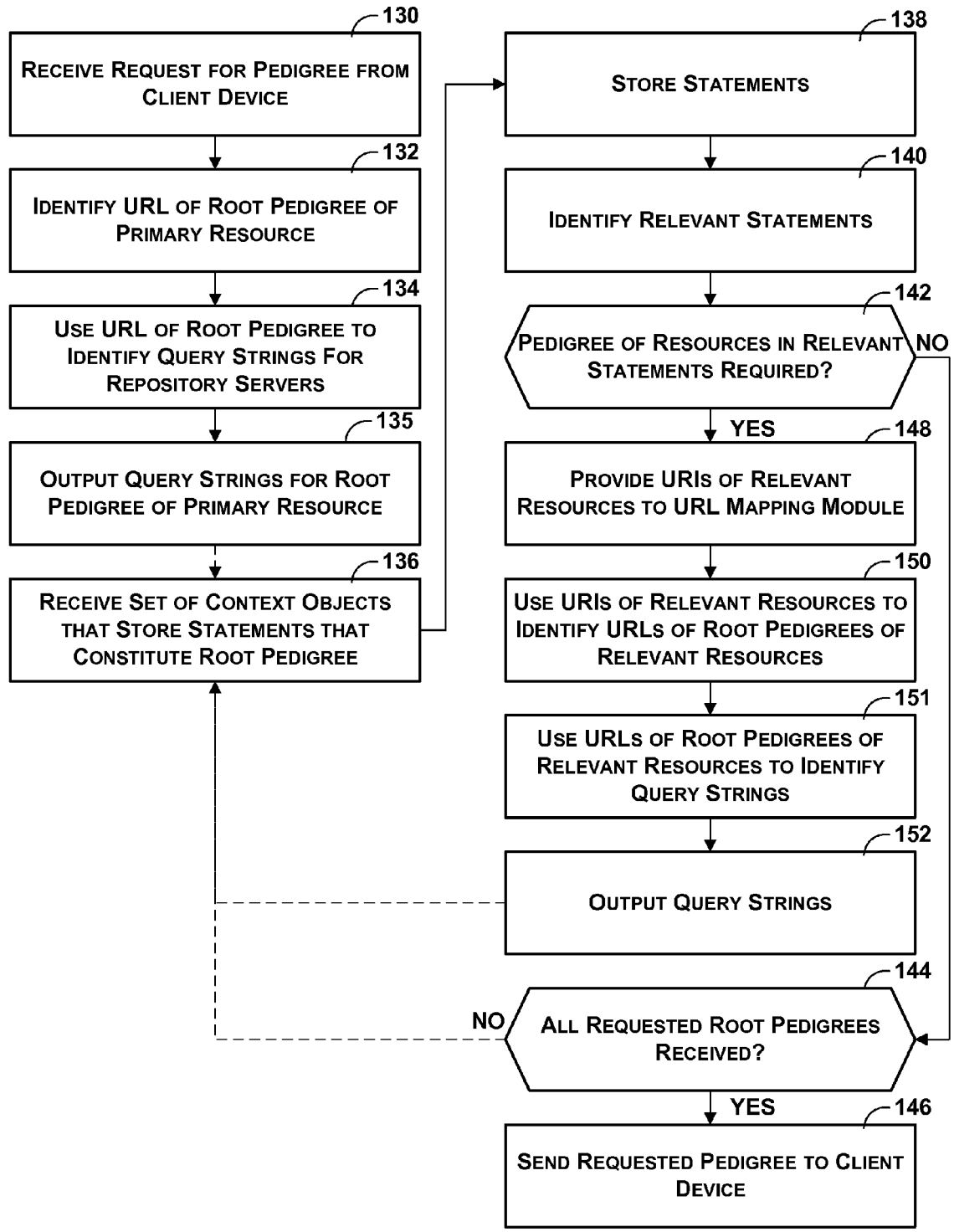
FIG. 6 is a flowchart illustrating an example operation of the context server to dynamically assemble a pedigree of a resource.

FIG. 6 is a flowchart illustrating an example operation of context assembly device 5 to dynamically assemble a pedigree of a resource. Initially, network interface 75 receives a request from client device 4 for a pedigree of a resource (130). For purposes of explanation, this disclosure refers to the resource for which client device 4 is requesting the pedigree as the "primary resource." After network interface 75 receives the request, URL mapping module 73 generates a URL of a root pedigree of the primary resource (132). The URL of the root pedigree of the primary resource may include a query string for context objects that include one or more statements that specify a relationship between the primary resource and other resources.

After URL mapping module 73 identifies the URL of the root pedigree of the primary resource, each of pedigree communication modules 77 may use the URL of the root pedigree to identify a first-stage query that an associated one of pedigree management servers 7 is able to process (134). For example, repository communication module 77M may be associated with repository server 6M. In this example, repository communication module 77M may use the URL of the root pedigree to identify a SPARQL query for statements in the root pedigree. In another example, repository communication module 77A may be associated with repository server 6A and repository server 6A may store context objects in a SQL database. In this example, repository communication module 77A may use the URL of the root pedigree to identify a SQL query for context objects that include statements in the root pedigree. After pedigree communication modules 77 identify the queries, repository communication modules 75 may cause network interface 75 to send the queries to the appropriate ones of pedigree management servers 7 (135). The request for the root pedigree of the primary resource may specify the URL of the root pedigree of the primary resource.

Subsequently, context assembly device 5 may receive from one or more of pedigree management servers 7 one or more context objects that store statements that specify relationships between a target resource and other resources (136). In addition, context assembly device 5 may receive sets of relevant statements directly from ones of pedigree management servers 7 that do not organize and store statements in discrete context objects, such as in the case of where a pedigree management server comprises a database of pedigree statements. As used herein, a "target" resource is the resource that all statements in the root pedigree of the target resource specify. For instance, if the target resource is the primary resource, context assembly device 5 may receive one or more context objects that store statements that constitute a root pedigree of the primary resource. In this manner, the composability of RDF graphs utilized by the techniques described herein allow pieces of a pedigree to be gathered from multiple places and composed into one pedigree graph. However, components of context assembly device 5 may perform exemplary steps 136 through 148 of FIG. 6 whenever context assembly device 5 receives a set of context objects that store statements that specify relationships between any target resource and other resources. In one embodiment, context assembly device 5 stores all of the received context objects without filtering or culling within the context cache 76 (138).

Next, second-stage query module 74 operates on the cached statements of the context objects to identify statements relevant to assembly of the requested pedigree (140). The relevant statements in the context objects are those statements that express a type of relationship specified by the request from client device 4 that specify the target resource as a subject or an object. For ease of explanation, this disclosure refers to a resource specified by a relevant statement other than the target resource as a "relevant resource." For instance, the request may include parameters that indicate that the pedigree should only include statements that specify the "derived from" and "published by" relationships. In this instance, the relevant statements may be those statements that specify that the target resource "is derived from" another resource (i.e., a relevant resource), and statements that specify that the resource "is published by" another resource. In this instance, second-stage query module 74 may identify all statements in the context object in which the target resource is published by another resource and all statements in the context object in which the target resource is derived from another resource. In accordance with one implementation, second-stage query module 74 may identify the relevant statements in the context object by performing a second-stage query on statements in the context object.

After second-stage query module 74 identifies the relevant statements in the context object, context completion module 82 is invoked to determine whether any root pedigrees of the relevant resources are required in order to complete the pedigree requested by client device 4 (142). For instance, if client device 4 requested only the root pedigree of the primary resource and if first-stage query module 72 has already outputted a request for the root pedigree of the primary resource, context completion module 82 may determine that root pedigrees of the relevant resources are not required in order to complete the root pedigree of the primary resource.

If context completion module 82 determines that the root pedigrees of the relevant resources are not required in order to complete the pedigree requested by client device 4 ("NO" of 142), context completion module 82 may determine whether context assembly device 5 has received all root pedigrees requested by first-stage query module 72 (144). If context completion module 82 determines that context assembly device 5 has not received all root pedigrees requested by pedigree communication modules 77 ("NO" of 144), the components of context assembly device 5 may perform no further action until context assembly device 5 again receives a root pedigree of a target resource (136). On the other hand, if context completion module 82 determines that context assembly device 5 has received all root pedigrees requested by pedigree communication modules 77 ("YES" of 144), context completion module 82 may send the requested pedigree to client device 4 (146).

If context completion module 82 determines that the root pedigrees of relevant resources are required in order to complete the pedigree requested by client device 4 ("YES" of 142), context completion module 82 may provide to URL mapping module 73 a list of URIs associated with the relevant resources (148).

When context completion module 82 provides to URL mapping module 73 the list of URIs associated with the relevant resources, URL mapping module 73 may identify URLs associated with the root pedigrees of each of the relevant resources (150). After identifying the URLs associated with the root pedigrees of each of the relevant resources, URL mapping module 73 may use the URLs of the root pedigrees to identify query strings that are appropriate to individual ones of pedigree management servers 7 (151). Next, pedigree communication modules 77 may cause network interface 75 to output on network 8 requests for the root pedigrees of the relevant resources (152). Subsequently, context assembly device 5 may receive a root pedigree in response to one of the requests (136), and so on.

The functions described in this disclosure may be applied to information stored and/or retrieved using data storage media or communicated, e.g., transmitted and/or received, via a wired or wireless communication system. Examples of wired and wireless communication systems include any communication techniques including without limitation wireless transmission using CDMA, GSM, 802.11, Bluetooth, ultra wide band (UWB), OFDM, FDMA, TDMA, W-CDMA, or any other radio access techniques or technologies, and wired or wireless transmission using any of a variety of network protocols such as TCP/IP, ATM, or the like. The functions may be applied to any type of data including but not limited to music data, video data, multimedia data, or other entertainment data, financial data, security data, business data, government data, military data, marketing data, sales data, medical patient data, medical diagnostic data, medical imaging data, data representing graphical or textual content, image data, chemical data, geographic data, mapping data, television broadcast data, radio broadcast data, email data, Internet data, personal data, or the like.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various embodiments of the invention have been described. These and other embodiments are within the scope of the following claims.

The invention claimed is:

1. A method comprising:
    receiving, with a context assembly device, a request to assemble a pedigree that describes a history of origin of a primary resource, wherein the requested pedigree of the primary resource represents the history as a set of statements that describe relationships between the primary resource and a plurality of other resources from which an asserted fact of the primary resource was derived;
    submitting, from the context assembly device to a set of one or more pedigree management servers, a first query for a first set of pedigree fragments that each include one or more statements that specify direct relationships between the primary resource and a first set of resources, wherein the direct relationships indicate that the asserted fact of the primary resource was derived from data of the first set of the resources;
    receiving, in response to the first query, a first set of pedigree fragments, each of which includes one or more of the statements that specify the direct relationships between the primary resource and the first set of resources;
    submitting, with the context assembly device to the pedigree management servers, a second query for a second set of pedigree fragments that include one or more statements that specify direct relationships between the first set of resources and a second set of resources, wherein the direct relationships of the second set of pedigree fragments indicate that the data of the first set of resources was derived from data of the second set of the resources;
    receiving, in response to the second query, the second set of pedigree fragments, each of which includes one or more of the statements that specify the direct relationships between the first set of resources and the second set of resources; and
    assembling, with the context assembly device, the pedigree of the primary resource from the statements of the first set of pedigree fragments and the second set of pedigree fragments received from the pedigree management servers.

2. The method of claim 1, wherein the method further comprises receiving a request from a user to perform an action that requires the pedigree of the primary resource.

3. The method of claim 1,
    wherein receiving a request from a user comprises receiving a request from the user to evaluate a level of trustworthiness of the primary resource; and
    wherein the method further comprises using the pedigree to evaluate the level of trustworthiness of the primary resource.

4. The method of claim 1,
    wherein the primary resource is associated with a first Uniform Resource Identifier (URI);
    wherein each of the other resources is associated with a distinct URI; and
    wherein statements in the set of statements comprise Resource Description Framework (RDF) subject-predicate-object statements that specify the URI of the primary resource or the URIs of the other resources as subjects or objects.

5. The method of claim 1,
    wherein receiving the request comprising receiving a URI of an information object that includes the primary resource; and
    wherein the method further comprises using the URI of the information object to identify a URI that includes a query string that instructs the servers to return pedigree fragments that include one or more statements that specify a direct relationship between the primary resource and other resources.

6. The method of claim 1, wherein submitting the query comprises submitting a URI that includes a query string that instructs the servers to return pedigree fragments that include one or more statements that specify a direct relationship between the primary resource and other resources.

7. The method of claim 1,
    wherein each of the pedigree fragments includes metadata that describes the statements in the pedigree fragments; and
    wherein when the servers receive the query, the servers use the metadata to identify the pedigree fragments that include one or more statements that specify direct relationships between the primary resource and other resources.

8. The method of claim 1, wherein identifying statements in the set of statements comprises applying a second-stage query to the statements in the set of pedigree fragments in order to identify the statements in the set of statements.

9. A device comprising:
    a processor;
    an interface that receives a request to assemble a pedigree of a primary resource, wherein the pedigree of the primary resource includes a set of statements that describe relationships between the primary resource and other resources from which an asserted fact of the primary resource was derived;

a first-stage query module executing on the processor that submits to a set of one or more pedigree management servers a first query for pedigree fragments that include one or more statements that specify direct relationships between the primary resource and a first set of the resources, wherein the direct relationships indicate that the asserted fact of the primary resource was derived from data of the first set of the resources;

wherein the interface receives, in response to the query, a first set of pedigree fragments, each of which includes one or more of the statements that specify the direct relationships between the primary resource and the first set of resources; and a second-stage query module executing on the processor that queries the first set of pedigree fragments to identify statements that describe direct relationships between the primary resource and a second set of the resources, wherein the first-stage query module is configured to submit a second query to the pedigree management servers to obtain a second set of pedigree fragments that include one or more statements that specify direct relationships for the second set of resources, wherein the direct relationships of the second set of pedigree fragments refer to the second set of resources as objects within the statements; and a pedigree assembly module executing on the processor to assemble the pedigree of the primary resource from the statements of the first set of pedigree fragments and the second set of pedigree fragments received from the pedigree management servers.

10. The device of claim 9, wherein the pedigree comprises a pedigree of the primary resource.

11. The device of claim 9,
wherein the primary resource is associated with a first Uniform Resource Identifier (URI);
wherein each of the other resources is associated with a distinct URI; and
wherein statements in the set of statements comprise Resource Description Framework (RDF) subject-predicate-object statements that specify the URI of the primary resource or the URIs of the other resources as subjects or objects.

12. The device of claim 9,
wherein the request includes a URI of an information object that includes the primary resource; and
wherein the device comprises a URL mapping module that uses the URI of the information object to identify a URL that includes a query string that instructs the servers to return pedigree fragments that include one or more statements that specify a direct relationship between the primary resource and other resources.

13. The device of claim 9, wherein the first-stage query module submits a URI that includes a query string that instructs the servers to return pedigree fragments that include one or more statements that specify a direct relationship between the primary resource and other resources.

14. The device of claim 9,
wherein each of the pedigree fragments includes metadata that describes statements in the context objects; and
wherein when the servers receive the query, the servers use the metadata to identify the context objects that include one or more statements that specify direct relationships between the primary resource and other resources.

15. The device of claim 9,
wherein the second-query module identifies statements included in the set of statements at least in part by applying a second-stage query to the statements in the set of pedigree fragments in order to identify the statements in the set of statements.

16. A non-transitory computer-readable storage medium comprising instructions that, when executed by one or more processors, cause the one or more processors to:
receive a request to assemble a pedigree that describes a history of origin of a primary resource, wherein the pedigree of the primary resource represents the history as a set of statements that describe relationships between the primary resource and a plurality of other resources from which an asserted fact of the primary resource was derived;
submit, to a set of one or more pedigree management servers, a first query for a first set of pedigree fragments that each include one or more statements that specify direct relationships between the primary resource and a first set of resources, wherein the direct relationships indicate that the asserted fact of the primary resource was derived from data of the first set of the resources;
receive, in response to the first query, a first set of pedigree fragments, each of which includes one or more of the statements that specify the direct relationships between the primary resource and the first set of resources;
submit, to the pedigree management servers, a second query for a second set of pedigree fragments that include one or more statements that specify direct relationships between the first set of resources and a second set of resources, wherein the direct relationships of the second set of pedigree fragments indicate that the data of the first set of resources was derived from data of the second set of the resources;
receive, in response to the second query, the second set of pedigree fragments, each of which includes one or more of the statements that specify the direct relationships between the first set of resources and the second set of resources; and
assemble the pedigree of the primary resource from the statements of the first set of pedigree fragments and the second set of pedigree fragments received from the pedigree management servers.

17. The computer-readable storage medium of claim 16,
wherein the primary resource is associated with a first Uniform Resource Identifier (URI);
wherein each of the other resources is associated with a distinct URI; and
wherein statements in the set of statements comprise Resource Description Framework (RDF) subject-predicate-object statements that specify the URI of the primary resource or the URIs of the other resources as subjects or objects.

18. The computer-readable storage medium of claim 16, wherein the instructions cause the one or more processors to submit the query in part by causing the one or more processors to submit a URI that includes a query string that instructs the servers to return pedigree fragments that include one or more statements that specify a direct relationship between the primary resource and other resources.

* * * * *